(12) United States Patent
Ghosh et al.

(10) Patent No.: US 7,148,660 B2
(45) Date of Patent: Dec. 12, 2006

(54) SYSTEM AND METHOD FOR POWER CONVERSION USING SEMICONDUCTOR SWITCHES HAVING REVERSE VOLTAGE WITHSTAND CAPABILITY

(75) Inventors: Rajesh Ghosh, Bangalore (IN); Bansidhar Jagannath Phansalkar, Bangalore (IN); Silvio Colombi, Losone (CH)

(73) Assignee: General Electric Company, Niskayuna, NY (US)

( * ) Notice: Subject to any disclaimer, the term of this patent is extended or adjusted under 35 U.S.C. 154(b) by 77 days.

(21) Appl. No.: 10/954,896

(22) Filed: Sep. 30, 2004

(65) Prior Publication Data

US 2006/0072352 A1    Apr. 6, 2006

(51) Int. Cl.
G05F 1/70 (2006.01)
(52) U.S. Cl. ..................................... 323/207
(58) Field of Classification Search ................ 323/207, 323/205; 361/91.7, 91.5
See application file for complete search history.

(56) References Cited

U.S. PATENT DOCUMENTS

| 4,651,265 | A | * | 3/1987 | Stacey et al. ................. 363/35 |
| 5,270,913 | A | | 12/1993 | Limpaecher ................ 363/140 |
| 5,367,448 | A | | 11/1994 | Carroll ........................ 363/89 |
| 5,570,279 | A | | 10/1996 | Venkataramanan ......... 363/127 |
| 5,633,793 | A | | 5/1997 | Lee et al. .................... 363/127 |
| 5,751,138 | A | * | 5/1998 | Venkata et al. ............. 323/207 |
| 6,426,666 | B1 | | 7/2002 | Li et al. ...................... 327/438 |
| 6,710,639 | B1 | | 3/2004 | Huang et al. ............... 327/438 |
| 6,757,184 | B1 | | 6/2004 | Wei et al. ..................... 363/71 |
| 2004/0027839 | A1 | | 2/2004 | Deng et al. ................... 363/37 |

FOREIGN PATENT DOCUMENTS

WO    WO 99/17374    4/1999

OTHER PUBLICATIONS

Marcel .PJ. Gaudreau, and Michael A. Kempkes; "A Solid-State Switch for 13.8kV Power Distribution"; pp. 1-10; www.divtecs.com/papers/PDF/PES_2001_138switch.pdf, no month.
Terry Allinder ; "An Innovative Approach to Achieving Single Stage PFC and Step-Down Conversion for Distributive Systems"; Publication Order No. AND8147/D; Semiconductor Components Industries, LLC, 2004, Feb. 2004—Rev. 0; pp. 1-8; http://onsemi.com.
A. Lindemann; "A New IGBT with Reverse Blocking Capability"; Entwurf für EPE Conference, Graz, 2001; pp. 1-7; www.ixys.com/t052804.pdf, no month.
M. Takei, T. Naito and K. Ueno; "Reverse blocking IGBT for matrix converter with ultra-thin wafer technology"; IEE Proc.-Circuits Devices Syst., vol. 151, No. 3, Jun. 2004; pp. 243-247.

* cited by examiner

*Primary Examiner*—Shawn Riley
(74) *Attorney, Agent, or Firm*—Fletcher Yoder

(57) ABSTRACT

A power converter system is provided for supplying power to an electrical load. The power converter system includes a power converter circuit adapted to perform an AC to DC power conversion and an active clamp circuit coupled to the power converter circuit for regulating DC bus voltage overshoots. The power converter circuit is configured from a plurality of semiconductor switches having reverse voltage withstand capability.

25 Claims, 6 Drawing Sheets

SYSTEM AND METHOD FOR POWER CONVERSION USING SEMICONDUCTOR SWITCHES HAVING REVERSE VOLTAGE WITHSTAND CAPABILITY

BACKGROUND

The invention relates generally to a power converter system and more specifically to an AC to DC step down power converter system.

Power converters are used in a wide variety of applications. Equipment such as UPS's, battery chargers, AC-DC power supplies and others use an AC-DC power converter to convert incoming AC, typically from a power grid, to DC power output. Typically, techniques such as PWM (pulse width modulation) boost conversion have been successfully deployed to produce AC-DC power converters with high power factor and sinusoidal input currents. However the DC voltage in such cases is higher than the peak value of the AC supply (boost function). In a wide variety of applications, such as those mentioned above, the DC voltage required is usually lower than the peak value of the AC supply (step down function).

Current techniques and devices employed for achieving a AC-DC step down function, such as thyristor controlled rectifiers, input step down transformers, additional DC-DC power conversion circuits and others have a low power factor and inject harmonics into the AC source. Generally, an additional power factor correction stage may be incorporated in such power converters. Two stage power converters combining the power factor correction stage, with a down converter stage, are typically used when high efficiency and low input current harmonics are required. However, typical two stage power converters are costly for low power applications. In addition, compliance to standards, such as IEEE 519, requires additional equipment that is expensive, bulky and generally reduces the overall efficiency of the system. Hence, present methods have limitations for achieving high level of power factor and low harmonic performance for AC-DC step down function and tend to be expensive and less efficient.

It is therefore desirable to provide a cost-effective and efficient AC-DC step down power converter having high power factor and a low level of input current harmonics.

BRIEF DESCRIPTION

Briefly, in accordance with one aspect of the technique, a power converter system is provided for supplying power to an electrical load. The power converter system includes a power converter circuit adapted to perform an AC-DC power conversion and comprising a plurality of semiconductor switches having reverse voltage withstand capability. The power converter system also includes a power factor control loop for regulating power factor, a DC voltage control loop for regulating the output DC voltage and a controller coupled to the power converter circuit for regulating switching of the plurality of semiconductor switches based on a feedback signal received from at least one of the power factor control loop and the DC voltage control loop.

In accordance with another aspect of the technique, a power converter system is provided for supplying power to an electrical load. The power converter system includes a power converter circuit adapted to perform an AC to DC power conversion and comprising a plurality of semiconductor switches having reverse voltage withstand capability. The power converter system also includes an active clamp circuit coupled to the power converter circuit for regulating DC bus voltage overshoots.

In accordance with a further aspect of the technique, a method is provided for performing an AC to DC power conversion. The method provides for converting an input AC voltage to an output DC voltage via a plurality of semiconductor switches having reverse voltage withstand capability, regulating power factor via a power factor control loop, regulating the output DC voltage via a DC voltage control loop and regulating switching of the plurality of semiconductor switches based on a feedback signal received from at least one of the power factor control loop and the DC voltage control loop via a controller. Systems and computer programs that afford functionality of the type defined by this method may be provided by the present technique.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
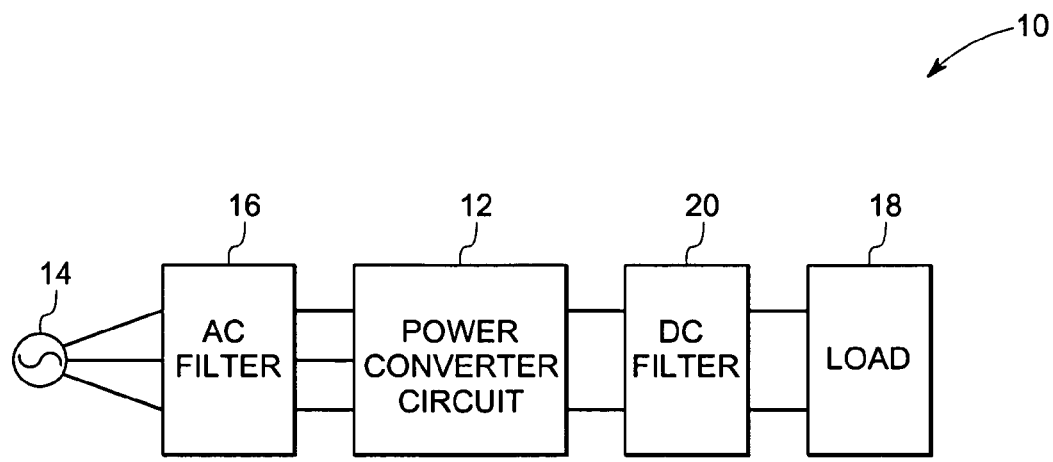
FIG. 1 depicts a block diagram of an exemplary power converter system in accordance with one aspect of the present technique.

FIG. 1 is a block diagram of a power converter system 10 implemented according to one aspect of the invention. The power converter system 10 includes a power converter circuit 12 for converting an input AC power to a DC power. The AC power from an AC source 14 is fed into the power converter circuit 12 via an AC filter 16. In the illustrated embodiment, the AC source 14 is a three-phase power from the power grid. Alternatively, the AC source 14 may be a single-phase power supply, multi-phase power supply or others. The AC filter 16 minimizes the harmonics generated by the power converter circuit 12 from entering into the AC source 14. The DC power from the power converter circuit 12 is fed to an electrical load 18 through a DC filter 20.

Figure 2:
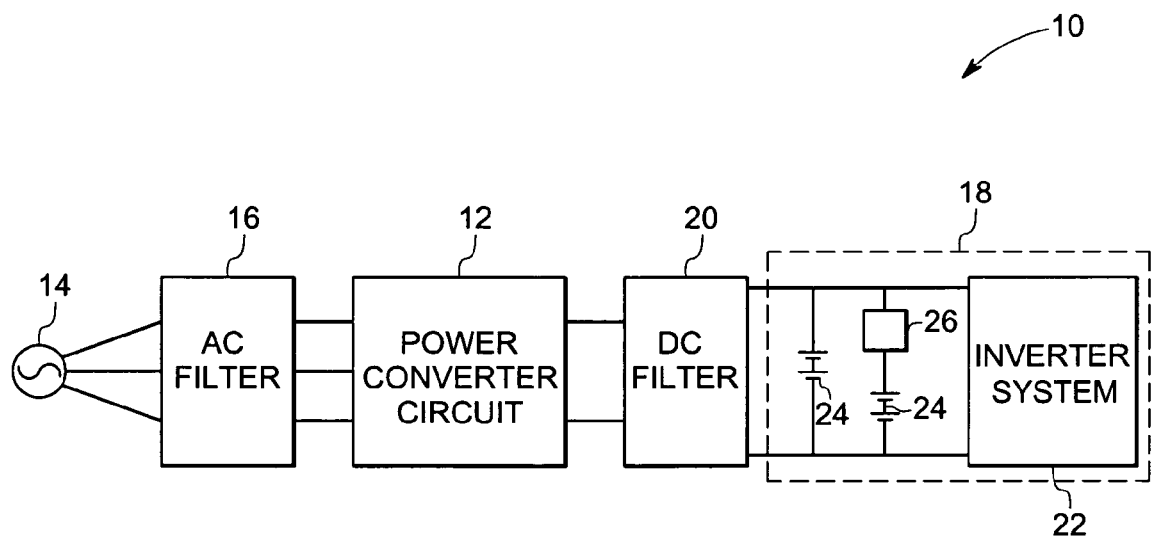
FIG. 2 depicts an alternative embodiment of the power converter system of FIG. 1.

The power converter system 10 is configured to supply DC power to an electrical load 18, such as resistive loads, dc motors or any other DC loads. Alternatively, the power converter system 10 may be coupled to various other DC fed systems as shown in FIG. 2. Such DC fed system includes but is not limited to an inverter system 22, energy storage devices such as a battery 24, a battery charger and/or another converter system 26. In one example, the power converter system 10 may be used in a UPS system for providing DC power to the inverter system as well as the battery charger.

Figure 3:
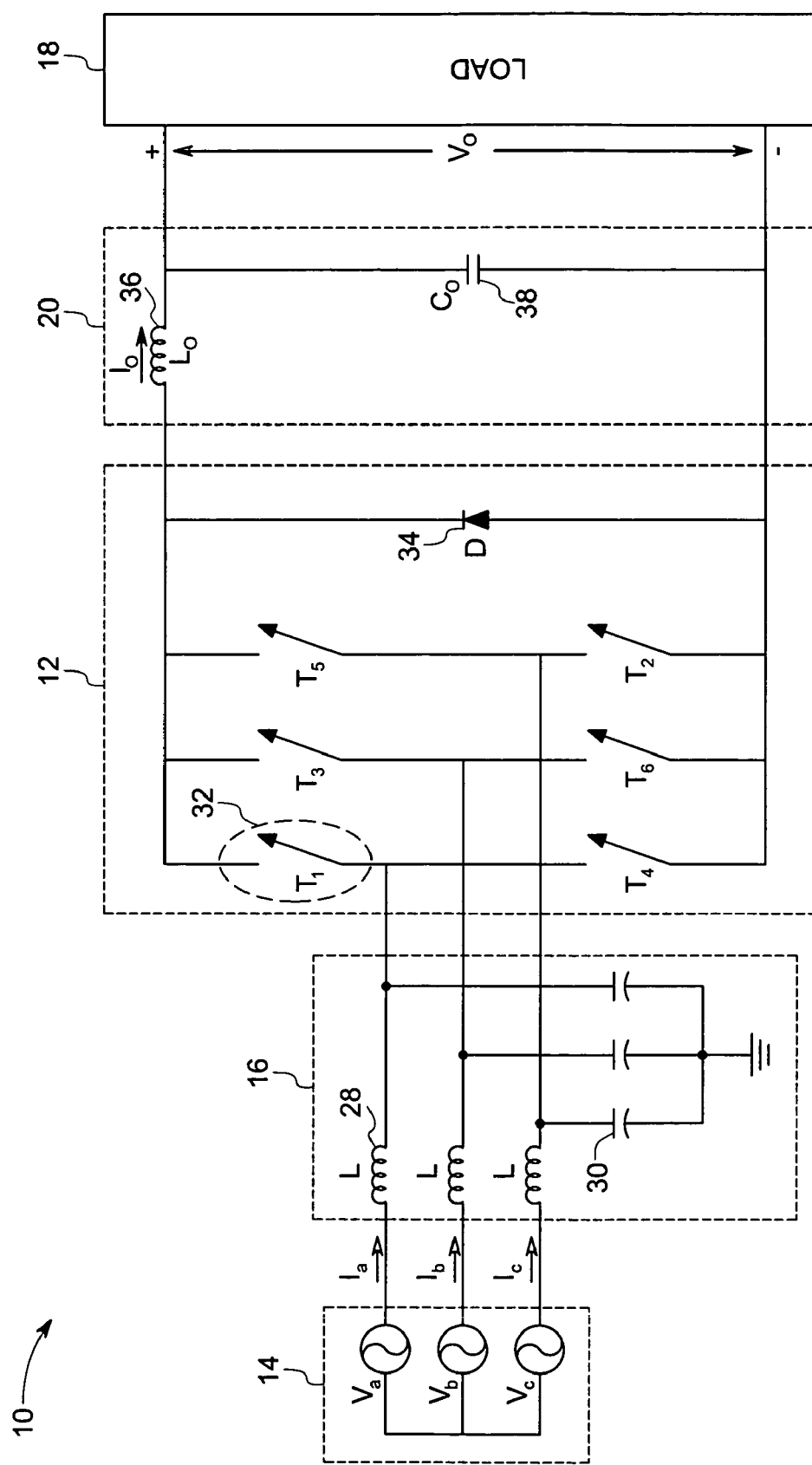
FIG. 3 depicts a detailed representation of the power converter system of FIG. 1 with semiconductor switches $T_1$-$T_6$ having reverse voltage withstand capability.

The power converter system 10 as discussed above is illustrated in a greater detail in FIG. 3. The AC filter 16 is an LC filter coupled to each phase of a three-phase power line and includes an inductor, L, 28 and a capacitor, C, 30. The three-phase power line is further coupled to a bridge rectifier of the power converter circuit 12. The bridge rectifier circuit is configured from a plurality of semiconductor switches 32 to provide an AC to DC power conversion. In one implementation, the AC to DC power conversion is a step down power conversion where the output DC voltage is lower than the peak value of the AC supply. In the illustrated embodiment, six semiconductor switches, $T_1$–$T_6$, are arranged in a configuration that may be referred to as a "B6" configuration as shown, to form the bridge rectifier with a three-phase AC input and a DC output. As would be appreciated by one skilled in the art, in one implementation, four semiconductor switches 32 may be arranged to form the bridge rectifier in case of a single-phase AC input. Each of the plurality of semiconductor switches 32 is adapted to withstand reverse voltage according to one aspect of the invention and is a gate controllable active switching device. The power converter circuit 12 is typically operated in a pulse width modulation mode. In particular, the power converter circuit may be operated in a current fed pulse width modulation mode.

The power converter circuit 12 further includes a freewheeling diode, D, 34 for circulating the DC current, $I_o$, thereby reducing the possibility of discontinuity in the DC current path. The DC power from the power converter circuit 12 is then supplied to an electrical load 18 coupled to the power converter circuit 12 via a DC filter 20. The DC filter 20 is typically an LC filter and includes an inductor, $L_o$, 36 and a capacitor, $C_o$, 38. In current fed power converter systems, the inductor $L_o$ is configured such that it draws a constant DC current, $I_o$, from the power converter circuit 12. Alternatively, in voltage fed power converter systems, the inductor, $L_o$, may not be present in the DC filter 20 so as to maintain a constant DC voltage. The capacitor, $C_o$, reduces the ripples in the output DC voltage.

Figure 4:
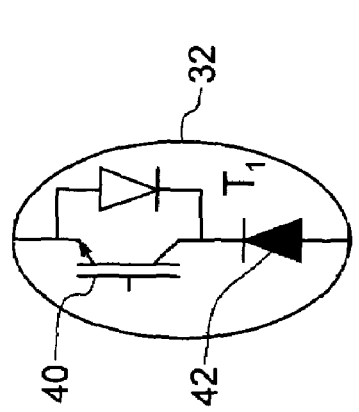
FIG. 4 depicts alternative embodiments of the semiconductor switches $T_1$-$T_6$ having reverse voltage withstand capability.
Figure 4:
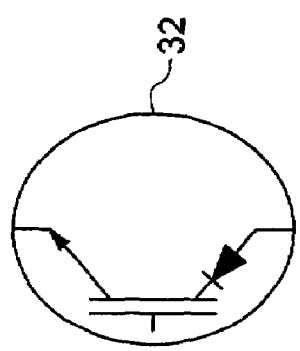
Figure 4:
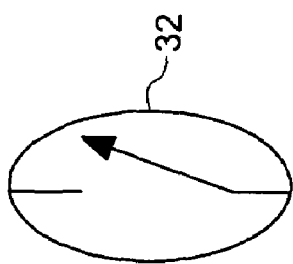

As shown in FIG. 4, the semiconductor switch 32 having reverse voltage withstand capability may be fabricated on a semiconductor substrate as a single bipolar switching device to suit the power and voltage requirements of the power converter system 10. Alternatively, the semiconductor switches $T_1$–$T_6$ having reverse voltage withstand capability may be configured from conventional unipolar switching devices 40 by coupling the unipolar switching device 40 to a blocking diode 42. It should be noted that any unipolar switching device such as IGBT, MOSFET, BJT or other gate controllable active switching device may be used for the purpose. As will be appreciated by one skilled in the art, the blocking diode 42 provides the reverse voltage withstand capability to the unipolar switching device 40. The semiconductor switches 32 are bipolar switching devices having a unidirectional current flow path and can withstand voltage in either direction. The direction of current flow in the semiconductor switch 32 is denoted by the direction of arrow in the semiconductor switch. As will be appreciated by one skilled in the art, the semiconductor switch 32 having reverse voltage withstand capability is not limited to the embodiments described above and may include any assembled, packaged and/or fabricated semiconductor switch that can withstand voltage in either direction.

As would be appreciated by one skilled in the art, power converter system 10, as described above, may employ the semiconductor switch 32 having reverse voltage withstand capability so as to provide step down power conversion at high power factor and reduced input current harmonics without employing an additional power factor correction stage, thereby making the power converter system 10 cost efficient for step down power conversion.

Figure 5:
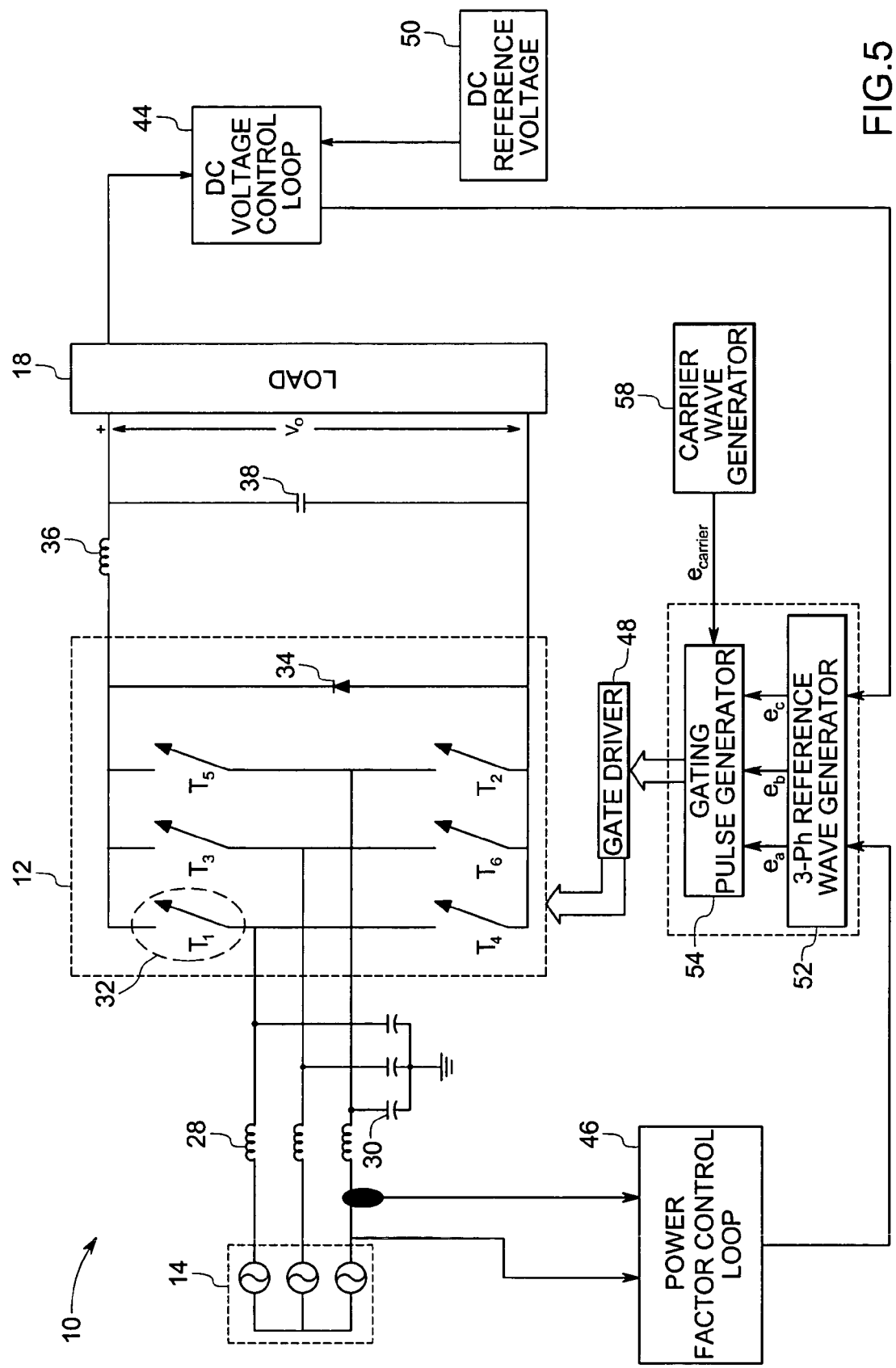
FIG. 5 is a diagrammatical view of the power converter system of FIG. 4 adapted for closed loop control in accordance with one aspect of the present technique.

The operation of the power converter circuit 12 is regulated via a controller such as one illustrated in FIG. 5. The controller typically includes two control loops—a DC voltage control loop 44 for DC voltage control and a power factor control loop 46 to provide power factor control. The controller further includes a gate driver 48 for switching the semiconductor switches $T_1$–$T_6$. In one embodiment, the switching of the semiconductor switches $T_1$–$T_6$ is regulated via pulse width modulation (PWM). The switching operation may be based on a feedback signal received from the power factor control loop 46 and/or the DC voltage control loop 44. In the illustrated embodiment, the power factor control loop 46 includes sensors for sensing the input current and the voltage and detectors coupled to each of the sensors for detecting the zero crossing of the sensed parameters. The power factor control loop 46 further includes logic circuitry for calculating a displacement factor ($\theta^*$) based on the zero crossings.

In the illustrated embodiment, the DC voltage control loop 44 includes a voltage sensor for sensing the output DC voltage. This voltage is then compared to a DC reference voltage 50. The DC voltage control loop also includes logic circuitry for calculating a modulation index ($m^*$). The controller may include a three-phase reference wave generator 52 for generating the reference wave based on the displacement factor and the modulation index, and a carrier wave generator 58 for generating a carrier wave. In one implementation, a sine wave may be employed as a reference wave and a saw tooth wave may be employed as a carrier wave. A gating pulse generator 54 that is a part of the controller may then generate a gating pulse based on the reference wave and the carrier wave. The gating pulse from the gating pulse generator 54 is used to regulate switching operation of the semiconductor switches $T_1$–$T_6$ via the gate driver 48, thereby regulating the output DC voltage. For a given peak value of AC voltage $V_m$, the output DC voltage is given by the equation:

$$V_o = \frac{3}{2} V_m \cdot m^* \cdot \cos(\theta^*)$$

Figure 6:
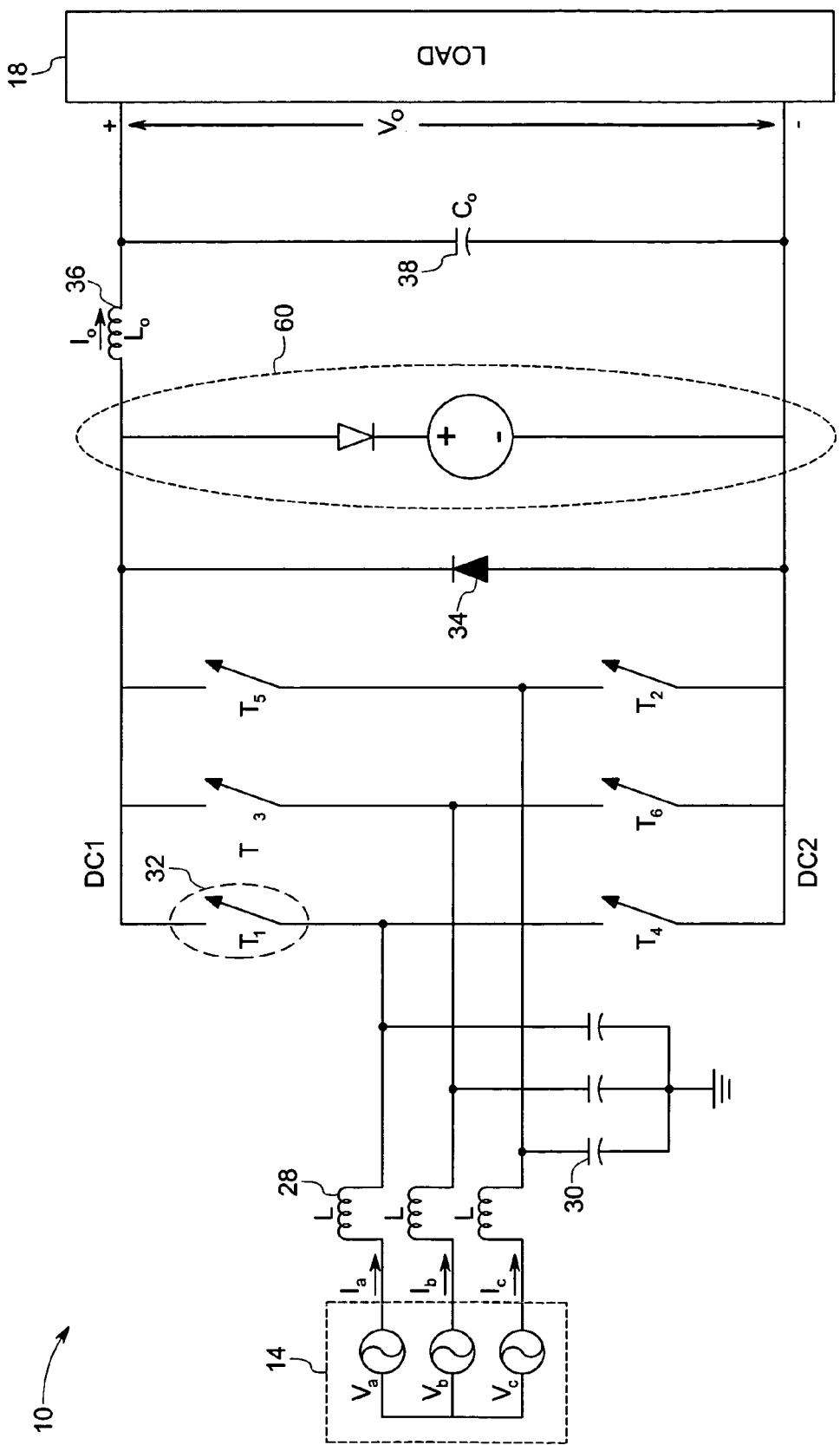
FIG. 6 depicts the power converter system of FIG. 4 with an active clamp circuit.

As the freewheeling diode 34 and/or blocking diodes 42 are not ideal diodes, the diode recovery and circuit layout parameters in the power converter circuit 12 may cause spikes or overshoots in the DC bus voltage. In case of a voltage fed power converter system, a capacitor coupled to the power converter circuit 12 may be used to reduce the overshoots in the DC bus voltage. Alternatively, a clamp circuit 60 may be used to minimize the spikes in the current fed power converter systems, as the capacitor will act as a short circuit while charging. As illustrated in FIG. 6, in one embodiment, the power converter system 10 may include a non-dissipative active clamp circuit or a buck boost converter 60 for effective and efficient limitation of the voltage overshoots in the DC bus voltage. It should be noted that a passive clamp circuit may be used to minimize the voltage overshoots. However, the active clamp circuit 60 acts as a constant voltage source and absorbs any overshoot energy and transfers it to the electrical load 18, thereby maintaining a lower voltage stress across the devices connected across the DC bus. The active clamp circuit 60 is coupled in series with the power converter circuit 12 and is shown in greater detail in FIG. 7.

Figure 7:
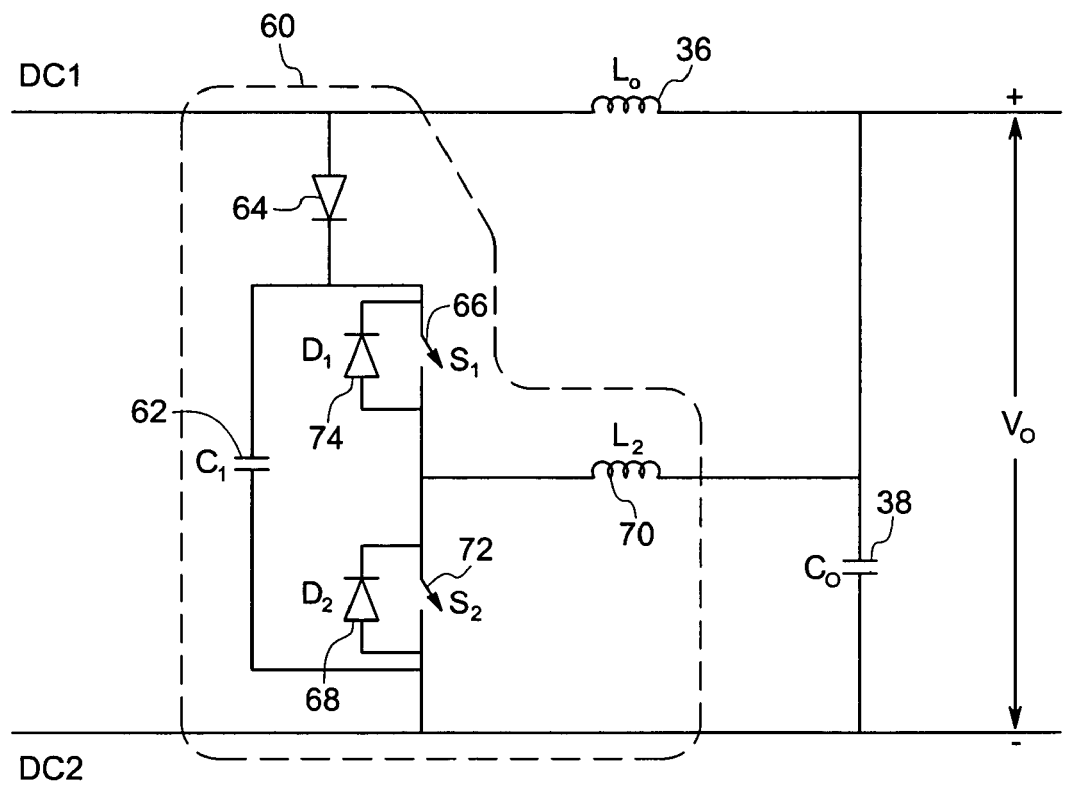
FIG. 7 depicts the active clamp circuit of FIG. 6 in greater detain and in accordance with one aspect of the present technique.

As illustrated in FIG. 7, the active clamp circuit 60 includes a capacitor, $C_1$, 62 that is charged to the DC bus voltage through a diode 64 in series with the capacitor $C_1$ during normal operation. When a voltage overshoot occurs, the capacitor $C_1$ absorbs the spike and gets charged to a higher value. Switch, $S_1$, 66 and diode, $D_2$, 68 forms a buck converter and transfers the energy from capacitor $C_1$ to capacitor $C_0$ via inductor, $L_2$, 70 when the voltage across $C_1$ exceeds a reference value. It should be noted that the reference value is a predetermined threshold value and is generally set to a value slightly above the normal dc bus voltage. Switch, $S_2$, 72 and diode, $D_1$, 74 forms a boost converter and maintains a constant voltage across $C_1$ by transferring the energy from $C_0$ to $C_1$ via inductor $L_2$ when the voltage across $C_1$ falls below the reference value. The switch $S_1$ and $S_2$ are triggered based on the voltage sensed across capacitor $C_1$. The control circuitry for switching of $S_1$ and $S_2$ is generally independent of the main control circuitry as these switches are typically operated at a faster rate than the semiconductor switches $T_1$–$T_6$. Alternatively, the switching of $S_1$ and $S_2$ may be coordinated with the main control circuitry.

The power converter system 10, as described in the various embodiments discussed above, provides step down power conversion having high power factor and a low level of input current harmonics, thereby increasing the efficiency of the power converter system. This is achieved at a lower cost by utilizing a semiconductor switch having reverse voltage withstand capability. In addition, the power converter system 10 is compliant to IEEE 519 standards. As the power converter system 10 provides a high quality, efficient and compact AC to DC step down power conversion, it can be used in a wide variety of electrical system having lower level of DC voltage requirement than that achieved from normal rectification. For example, the power converter system 10 may be coupled to equipment, such as UPS system, battery chargers and other DC systems, for providing the DC power supply. Also, the power converter system 10 may be coupled to generators, thereby reducing the size of the generators that is otherwise oversized.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power converter system for supplying power to an electrical load, the power converter system comprising:
   a power converter circuit adapted to perform an AC to DC power conversion and comprising a plurality of semiconductor switches having reverse voltage withstand capability;
   a power factor control loop for regulating a power factor;
   a DC voltage control loop for regulating an output DC voltage; and
   a controller coupled to the power converter circuit for regulating switching of the plurality of semiconductor switches based on a feedback signal received from at least one of the power factor control loop and the DC voltage control loop; and
   an active clamp circuit coupled to the power converter circuit for regulating DC bus voltage overshoots, wherein the active clamp circuit comprises:
   a capacitor connected across a DC bus and charged to a DC bus voltage;
   a buck converter circuit for discharging the capacitor when voltage across the capacitor exceeds a reference value; and
   a boost converter circuit for charging the capacitor when voltage across the capacitor falls below the reference value.

2. The power converter system of claim 1, wherein each of the plurality of semiconductor switches comprises a unipolar switching device in series with a blocking diode for providing reverse voltage withstand capability.

3. The power converter system of claim 2, wherein the unipolar switching device is at least one of an IGBT, a MOSFET, a BJT or any gate controllable active switching device.

4. The power converter system of claim 1, further comprising an AC filter on an AC side of the power converter circuit for reducing harmonics generated by the power converter circuit.

5. The power converter system of claim 1, further comprising a DC filter on a DC side of the power converter circuit for reducing ripples in the output DC voltage.

6. The power converter system of claim 5, wherein the DC filter further comprises an inductor and a capacitor.

7. The power converter system of claim 6, wherein the inductor maintains a substantially constant DC current.

8. The power converter system of claim 1, wherein the power converter circuit further comprises a freewheeling diode in parallel with the plurality of semiconductor switches for circulating DC current.

9. The power converter system of claim 1, wherein the controller regulates switching of the plurality of semiconductor switches via pulse width modulation.

10. The power converter system of claim 1, wherein the AC to DC power conversion is a step down power conversion.

11. The power converter system of claim 1, wherein the AC to DC power conversion is at least one of a three-phase AC to DC power conversion and single-phase AC to DC power conversion.

12. The power converter system of claim 1, wherein the reference value is a predetermined threshold value.

13. A power converter system for supplying power to an electrical load, the power converter system comprising:
   a power converter circuit adapted to perform an AC to DC power conversion and comprising a plurality of semiconductor switches having reverse voltage withstand capability; and
   an active clamp circuit coupled to the power converter circuit for regulating DC bus voltage overshoots, wherein the active clamp circuit is configured to discharge a capacitor connected across a DC bus when voltage across the capacitor exceeds a reference value and charge the capacitor when voltage across the capacitor falls below the reference value.

14. The power converter system of claim 13, wherein each semiconductor switch comprises a unipolar switching device in series with a blocking diode for providing reverse voltage withstand capability.

15. The power converter system of claim 14, wherein the unipolar switching device is at least one of an IGBT, a MOSFET, a BJT or any gate controllable active switching device.

16. The power converter system of claim 13, further comprising a controller coupled to the power converter circuit for regulating switching of the plurality of semiconductor switches via pulse width modulation.

17. The power converter system of claim 13, wherein the AC to DC power conversion is at least one of a three-phase AC to DC power conversion and a single-phase AC to DC power conversion.

18. The power converter system of claim 13, wherein the AC to DC power conversion is a step down power conversion.

19. A method for performing an AC to DC power conversion, the method comprising:
- converting an input AC voltage to an output DC voltage via a plurality of semiconductor switches having reverse voltage withstand capability;
- regulating power factor via a power factor control loop;
- regulating the output DC voltage via a DC voltage control loop;
- regulating switching of the plurality of semiconductor switches based on a feedback signal received from at least one of the power factor control loop and the DC voltage control loop via a controller; and
- regulating DC bus voltage overshoots by discharging a capacitor connected across a DC bus when voltage across the capacitor exceeds a reference value and charging the capacitor when voltage across the capacitor falls below the reference value.

20. The method of claim 19, wherein each semiconductor switch comprises a unipolar switching device in series with a blocking diode for providing reverse voltage withstand capability.

21. The method of claim 20, wherein the unipolar switching device is at least one of an IGBT, a MOSFET, a BJT or any gate controllable active switching device.

22. The method of claim 19, wherein regulating DC bus voltage overshoots comprises regulating DC bus voltage overshoots via an active clamp circuit.

23. The method of claim 19, wherein switching of the plurality of semiconductor switches comprises switching of the plurality of semiconductor switches via pulse width modulation.

24. The method of claim 19, wherein the AC to DC power conversion is a step down power conversion.

25. A power converter system for supplying power to an electrical load, the power converter system comprising:
- a power converter circuit adapted to perform an AC to DC power conversion and comprising a plurality of semiconductor switches having reverse voltage withstand capability;
- a power factor control loop for regulating a power factor;
- a DC voltage control loop for regulating an output DC voltage;
- a controller coupled to the power converter circuit for regulating switching of the plurality of semiconductor switches based on a feedback signal received from at least one of the power factor control loop and the DC voltage control loop; and
- an active clamp circuit coupled to the power converter circuit and configured to discharge a capacitor connected across a DC bus when voltage across the capacitor exceeds a reference value and charge the capacitor when voltage across the capacitor falls below the reference value.

* * * * *